United States Patent
Abuelsaad et al.

(10) Patent No.: US 7,818,681 B2
(45) Date of Patent: Oct. 19, 2010

(54) METHOD AND SYSTEM FOR INTERNALLY IDENTIFYING A SPECIFIC WEB BROWSER FOR DISPLAYING A SPECIFIC WEB PAGE

(75) Inventors: Tamer E. Abuelsaad, Poughkeepsie, NY (US); Kelly Aymar, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 11/839,675

(22) Filed: Aug. 16, 2007

(65) Prior Publication Data

US 2009/0049391 A1   Feb. 19, 2009

Related U.S. Application Data

(63) Continuation-in-part of application No. 11/770,305, filed on Jun. 28, 2007.

(51) Int. Cl.
G06F 3/00 (2006.01)
(52) U.S. Cl. ...................................... 715/760
(58) Field of Classification Search ............... None
See application file for complete search history.

(56) References Cited

U.S. PATENT DOCUMENTS

| | | | | |
|---|---|---|---|---|
| 5,956,720 | A * | 9/1999 | Fernandez et al. | 1/1 |
| 5,987,480 | A * | 11/1999 | Donohue et al. | 715/207 |
| 6,076,166 | A * | 6/2000 | Moshfeghi et al. | 726/4 |
| 6,304,886 | B1 * | 10/2001 | Bernardo et al. | 715/234 |
| 6,351,772 | B1 | 2/2002 | Murphy et al. | |
| 6,353,448 | B1 * | 3/2002 | Scarborough et al. | 715/744 |
| 6,748,418 | B1 | 6/2004 | Yoshida et al. | |
| 6,904,408 | B1 | 6/2005 | McCarthy et al. | |
| 2003/0028764 | A1 | 2/2003 | Campbell | |
| 2003/0051039 | A1 | 3/2003 | Brown et al. | |
| 2005/0246444 | A1 * | 11/2005 | Koehane et al. | 709/227 |
| 2006/0161503 | A1 | 7/2006 | Popescu et al. | |
| 2007/0240098 | A1 * | 10/2007 | Averett et al. | 717/104 |
| 2007/0271505 | A1 | 11/2007 | Dandekar et al. | |
| 2008/0178113 | A1 * | 7/2008 | Headrick et al. | 715/778 |
| 2008/0301562 | A1 | 12/2008 | Berger et al. | |

OTHER PUBLICATIONS

"Sizzling HTML Jalfrezi—F Tags—frames," available at http://www.htmlbyexample.com/frames/ff.htm. Last visited: Dec. 3, 2009 Screenshots provided, and retrieved from the Web Archive for 2004.*
Lunascape ver. 1.3.3, by Kondo (2004) (screenshots provided in pdf format). Program is available at http://download.cnet.com/Lunascape/3000-2356_4-10310739.html.

* cited by examiner

Primary Examiner—Neveen Abel Jalil
Assistant Examiner—Daniel Kinsaul
(74) Attorney, Agent, or Firm—Schmeiser, Olsen & Watts; William H. Steinberg

(57) ABSTRACT

Web browser information for the display of the web page is contained in HTML Meta tags of a web page for which access is desired. A web designer may incorporate preferred browser information within the meta tags. When the web page is accessed, the meta tags are inspected for such web browser preference information. When the preferred browser information is identified, availability of the preferred web browser on the particular computing device is determined. When the determination is that the preferred web browser is available, the web page is retrieved and display on the computing device using the identified preferred web browser.

18 Claims, 7 Drawing Sheets

600

| Patent Office | www.USPTO.gov | Browser 1 |
|---|---|---|
| Patent Attorney | www.Dwlaw.com | Browser 2 |
| Amusement Park | www.Park.com | Browser 3 |
| Grade School | www.the_academy.com | Browser 4 |

604 (top of middle column), 602 (left), 606 (right)

| | 600 | |
|---|---|---|
| | 604 | |
| Patent Office | www.USPTO.gov | Browser 1 |
| Patent Attorney | www.Dwlaw.com | Browser 2 |
| Amusement Park | www.Park.com | Browser 3 |
| Grade School | www.the_academy.com | Browser 4 |
| 602 | | 606 |

METHOD AND SYSTEM FOR INTERNALLY IDENTIFYING A SPECIFIC WEB BROWSER FOR DISPLAYING A SPECIFIC WEB PAGE

CROSS-REFERENCE TO RELATED APPLICATION

This application is a continuation-in-part to and claims priority from utility patent application Ser. No. 11/770,305 filed on Jun. 28, 2007.

FIELD OF THE INVENTION

This invention relates to a method and system for storing and accessing a specific web browser to display a specific web page wherein the specific web browser provides the optimum display quality from the set of browsers contained in the computing resource for the selected web page. This invention further relates to a method and system in which a specific web browser for displaying a web page is identified within that specific web page.

BACKGROUND OF THE INVENTION

A Web browser is a software application that enables a user to display and interact with text, images, and other information typically located on a Web page at a website on the World Wide Web or a local area network. Text and images on a Web page can contain hyperlinks to other Web pages at the same or different website. Web browsers allow a user to quickly and easily access information provided on many Web pages at many websites by traversing these links. Web browsers format HTML information for display, so the appearance of a Web page may differ between browsers. Web browsers communicate with Web servers primarily using HTTP (hypertext transfer protocol) to retrieve webpages. A web server is a computer program that is responsible for accepting HTTP requests from clients, which are known as Web browsers, and serving them HTTP responses along with optional data contents, which usually are Web pages such as HTML documents and linked objects (images, etc.).

A Web page or web page is a resource of information that is suitable for the World Wide Web and can be accessed through a web browser. This information is usually in HTML or XHTML format, and may provide navigation to other web pages via hypertext links. Web pages may be retrieved from a local computer or from a remote web server. The web server may restrict access only to a private network, e.g. a corporate intranet, or it may publish pages on the World Wide Web. Web pages are requested and served from web servers using Hypertext Transfer Protocol (HTTP). A web page is a type of web document. Web pages may consist of files of static text stored within the web server's file system (static web pages), or the web server may construct the (X)HTML for each web page when it is requested by a browser (dynamic web pages). Client-side scripting can make web pages more responsive to user input once in the client browser.

With the constant emergence of new website content display technologies, not all web browsers are able to render their content as originally intended by the web site's author. Many web browsers rely on plugins to display web content properly. Consequently, a user's visual representation of web site between one browser and another can look very different depending on what that browser has the capability to render. A common phrase seen on some web sites is the phrase "this content is best viewed in Internet Explorer".

As an example, the United States Patent and Trademark Office website (www.uspto.gov) displays images of patents. However, not all web browsers can adequately display these patent images. Therefore for a user to access the patent office web site and view the display images of the patents a user would need to be aware of the browser that the can best display the patent images. The user would need to access the website through the browser that best displays these pages.

The need to continually track the display capabilities of a web browser with regard to displaying particular web pages can be a source of frustration for the user. This present a level of frustration to the user. Having to keep switching web browsers and remembering which site looks and works best in which browser needs to be addressed. Furthermore, many web designers know the best web browser to display their particular web site or web page. There remains a need for method and system that can identify a preferred web browser for display of a web browser based on information contained in the actual web page that is to be displayed.

SUMMARY OF THE INVENTION

The present invention describes a method and system wherein a specified web browser for displaying a particular web page can be identified within that actual web page. Once identified, the web page can be displayed using the identified web browser. A container browser having several conventional browsers can be accessed to initiate the specified browser for display of the web site.

During the creation of a web page, the web designer can use Meta tags contained in the HTML to identify or specify a preferred browser for displaying the web page. When a user attempts to access the web page, according to the present invention, the meta tags are inspected to determine if there is an identified web browser. When the determination is that there is a web browser and that web browser is available on the computing equipment of the user attempting the access, then the web page is opened using the identified web browser. When there is an identified browser, the present invention can further create a record in the computing equipment or in a container browser to associate the specified web browser with the particular web page. In the present invention, the web page designer can also include multiple preferred browsers in the meta tags. These browsers could be listed in a priority manner with the more preferred browser receiving the higher priority.

The invention is describing the Meta tag name to be some name that the container browser would know, such as but not exclusive, PrefferredBrowser. The content would contain a delimited list of browser identifiers, such as, IE6.1 or FIRE-FOX1.5.

The delimiter can be anything a comma, a semicolon, etc. . . . The browser identifier can be the name of the program that is used to launch the web browser, such as, iexplorer.exe, or an alias that the user configures in the container browser to refer to the specific web browser. Below are examples of sample meta tags:

<META name="PrefferredBrowser" content="IE,FireFox,mozilla">

<META name="PrefferredBrowser" content="IE">

<META name="PrefferredBrowser" content="FireFox, opera2.1"> (where the name "opera2.1" has been configured by the user in the container web browser to refer to a specific web browser)

In addition, there can be many Meta tags in the HTML code of a web page.

DETAILED DESCRIPTION OF THE INVENTION

The present invention provides a method and system for marking web browsers to be associated with specific web sites. The marked web browsers will be used to view the associated web site. The intent of this concept is to provide a web browser that more optimally displays the specified web site. The description of the present invention will be in the context of an application within a container browser. This type of browser is a container browser or a super browser that stores other web browsers and enables a user to launch any stored web browser and display a designated web page from a preferred browser. This container browser can track and bookmark the browsers such that the browsers could be easily selected and initiated.

Figure 1:
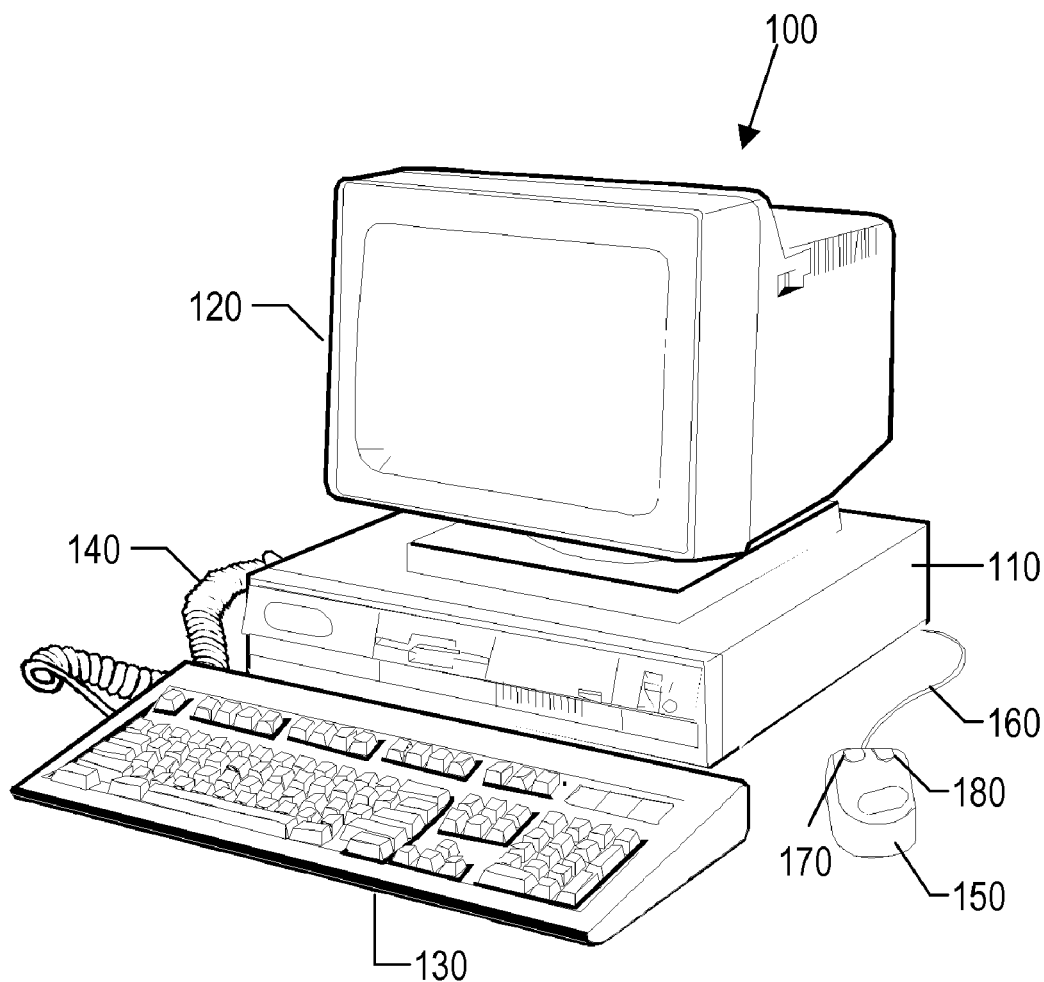
FIG. 1 is a pictorial representation of a personal computing device, which may be used in implementation of the present invention.

With reference now to FIG. 1, there is depicted a pictorial representation of a data processing system that includes computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, computing device 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150. Mouse 150 is coupled to processor 110, in a manner well known in the art, via cable 160. As is shown, mouse 150 may include left button 170, and right button 180, each of which may be depressed, or "clicked", to provide command and control signals to computing device 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that computing device 100 may be implemented utilizing a personal computer.

Figure 2:
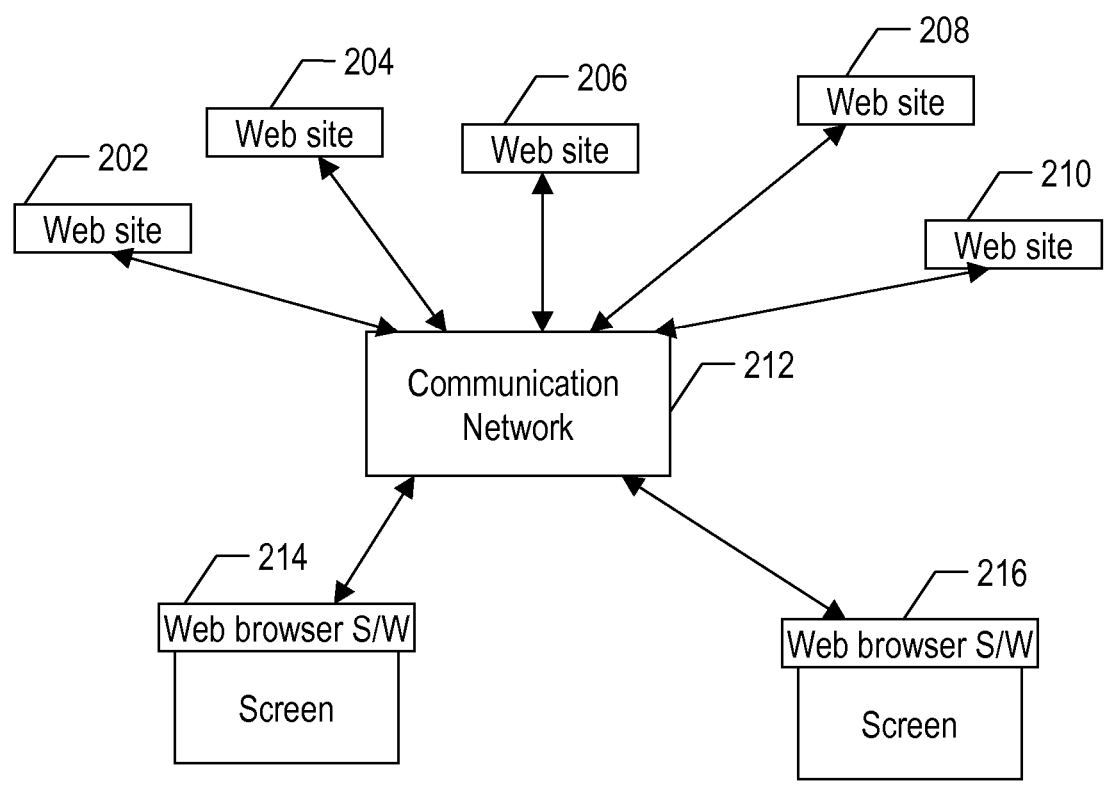
FIG. 2 is a display of a general configuration of the connection patterns for communication network, which includes web sites and users that can view the web sites through web browsers.

FIG. 2 is an illustration of a communication network configuration through which a user can access and display a website. Shown is a network 200 that contains several websites (202, 204, 206, 208 and 210). As previously discussed, a web page is a resource of information that exists on a communication network 212 such as the Internet or World Wide Web and can be accessed through a web browser 216 and/or a web browser 214. The computing device 100 (see FIG. 1) contains a software browser program. When activated, the browser program establishes communications with a web page viewed through the communication network. In most applications, the initial or default web page comes when a user initially establishes a connection to the communication network. This web page is usually associated with a default web browser for that user.

Figures 3, 6:
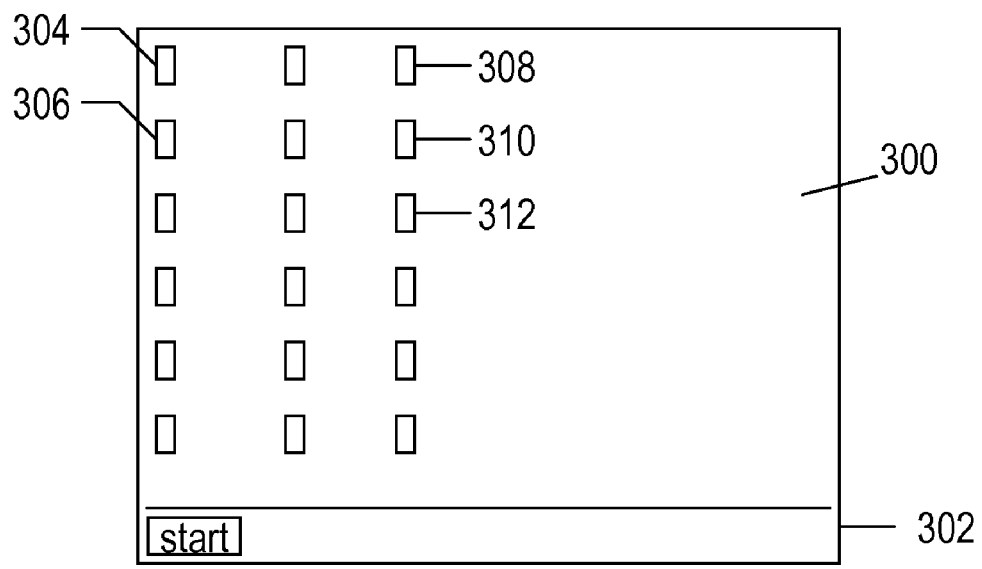
FIG. 3 is a display of a computer device screen or desk top that contains various icons used to activate various programs on the computing device including used to activate web site browsers from the computer device.
FIG. 6 is a set of records created and contained in accordance with the present invention that contains information including a web site name, web site URL and a web browser for displaying the web site.

FIG. 3 is an illustration of a conventional computing device video display 120 or computer screen 300. This screen has a bottom display section 302 that displays various command options. In this example, clicking the 'start' icon produces a list of commands from which the user can select. The main portion of the screen also contains several icons such as 304, 306, 308, 310, and 312. These icons can provide access and activation of several application programs stored in the computing device. Icons 304, 306, 308, 310 and 312 can activate web browser programs stored on the computing device. The clicking of a web browser can establish access to the communication network. In conventional processes, when this occurs, any web page is opened in that browser. With the present invention, clicking any browser icon could activate the container browser. The initial or default browser page could be one associated with the container browser or could be another default browser that the user can specify.

Figure 4:
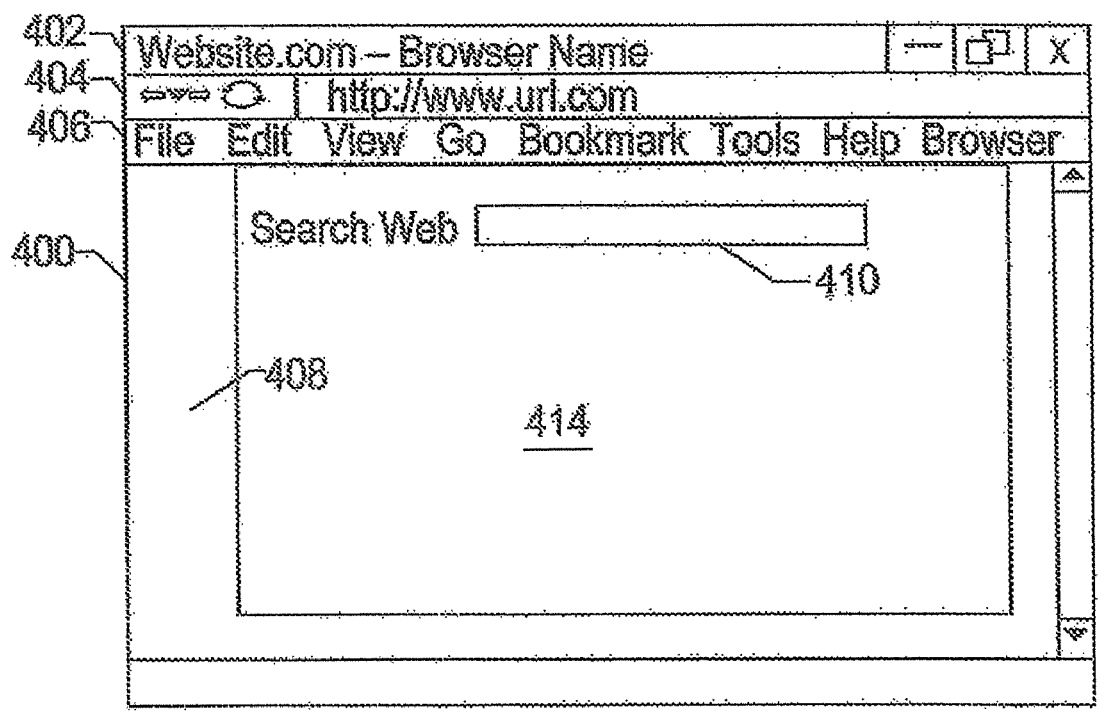
FIG. 4 is a web site screen in accordance with the present invention displaying a browser option that can allow a user to designate a specific web browser through which the user desires to view the web site.

FIG. 4 shows a web page 414 of the present invention incorporating the container browser concept of the present invention. Similar to many computer screen displays for application programs, screen 400 contains are several lines of information and options. Line 402 has information tells the name of the web site and the name of the browser through which the web site is displayed. Line 404 has option icons '←' and '→' that enable a user to scroll back to previous web sites or forward to other web sites. In addition, line 404 also contains a locator of the Uniform Resource Locator "URL" for the current web site that is displayed on the screen. Line 406 contains icons that indicate various commands that the user can perform. One of these commands can be a 'Browser' command that activates the container browser program. The display can contain a section 408 with links to other web sites. The web page 414 also contains a search option 410. This search feature enables the user to search for other web sites based on search criteria this is included in the search space.

Figure 5:
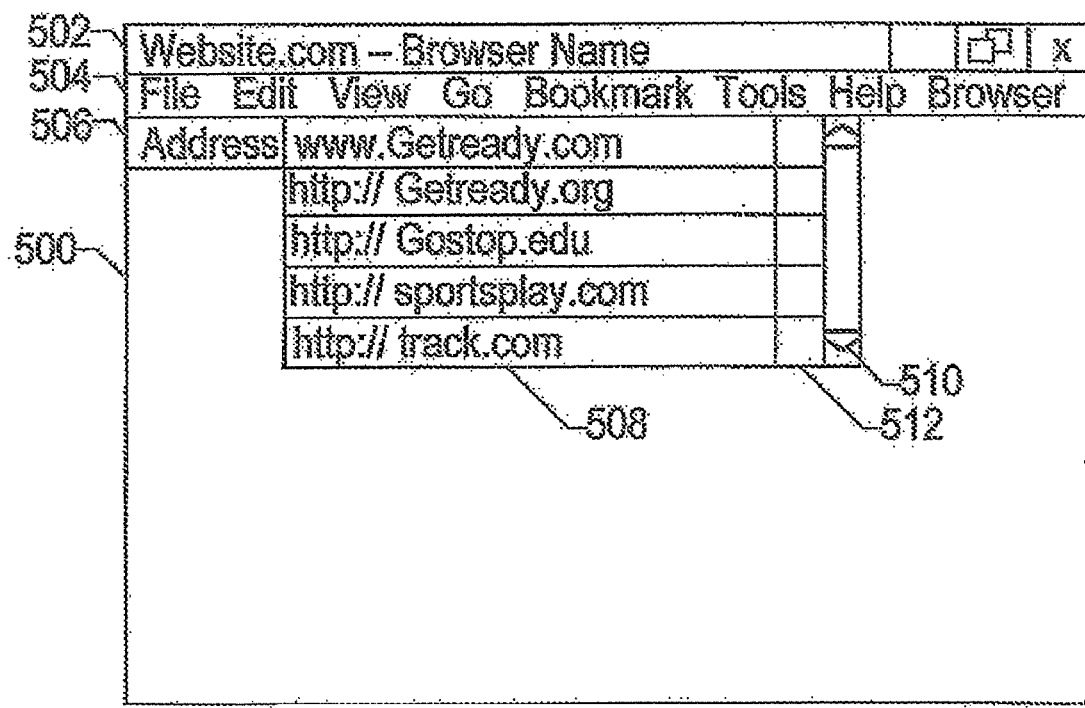
FIG. 5 is a web site screen in accordance with the present invention displaying a browser option and a drop down listing of websites, with each web site having a designated web browser through which a user can view the web site.

FIG. 5 illustrates a list of stored of web pages stored in a container browser in accordance with the present invention. As shown, the computer screen contains a default web page 500 that the user sees when the computer device 100 (see FIG. 1) is initially connected to the communication network via a default browser. The web page contains the previously discussed information lines 502, 504 and 506. Line 506 contains the address or URL of the default web page (the initial web page that comes up when initially connected to the communication network). Clicking an accessed web site icon of the down arrow 510 can produce the pull down display 508 containing a list of websites that have been accessed by the user. This list of websites could also be from a set of web sites that are stored in the container browser. The container browser will contain a list of marked websites and the preferred browser to display the web site contents. The list contains the URL for a web site and the designated web browser for each web site in field 512.

FIG. 6 is a set of records 600 created and contained in the container browser storage location. These records contain three fields. The first field 602 describes the name of the web site. The second field 604 contains the URL for the web site. The third field 606 contains the specific and designated web browser to display that web site. These record entries can exist for each site that a user accesses or just for the web sites that the user designates.

The method of the invention has two aspects. One aspect involves coding in a desired web browser for displaying a web page. The second and primary aspect involves retrieving a preferred web browser for a particular web page based on information coded into the web page. In the first aspect, the web page designer uses meta tags to code in a preferred web page browser. In computer programming, the HTML META element META tag can be used to identify properties of a document (e.g., author, expiration date, a list of key words, etc.) and assign values to those properties. This specification does not define a normative set of properties. Each META element META tag specifies a property/value pair. The name attribute identifies the property and the content attribute specifies the property's value. For example, the following declaration sets a value for the Author property:

<META name="Author" content="Dave Raggett">

Below is code from the United States Patent and Trademark Office (USPTO) website "www.uspto.gov". Line 6 is a meta tag line where the web designer could insert a desired web browser to display the website. When a user accesses a website, the super container browser would search for any information contained in this meta tag location. IF the web designer specified a browser, the container browser would display the website in that browser.

<!DOCTYPE html PUBLIC "-//W3C//DTD XHTML 1.0
      Transitional//EN" "http://www.w3.org/TR/xhtml1/
      DTD/xhtml1-transitional.dtd">
    <html xmlns="http://www.w3.org/1999/xhtml">
    <head>
      <title>United States Patent and Trademark Office Home
        Page</title>
      <meta http-equiv="Content-Type" content="text/html;
        charset=iso-8859-1"/>
      <style type="text/css">
      <!--

In this line 6, the web designer could specify a particular or preferred web browser to display the web page.

<!DOCTYPE html PUBLIC "-//W3C//DTD XHTML 1.0
      Transitional//EN" "http://www.w3.org/TR/xhtml1/
      DTD/xhtml1-transitional.dtd">

-continued

<html xmlns="http://www.w3.org/1999/xhtml">
    <head>
      <title>United States Patent and Trademark Office Home Page</title>
      <meta http-equiv="Content-Type" content="text/html; charset=iso-8859-1" />
    <style type="text/css">
    <!--

In this line 6, the web designer could specify a particular or preferred web browser to display the web page.

Figure 7:
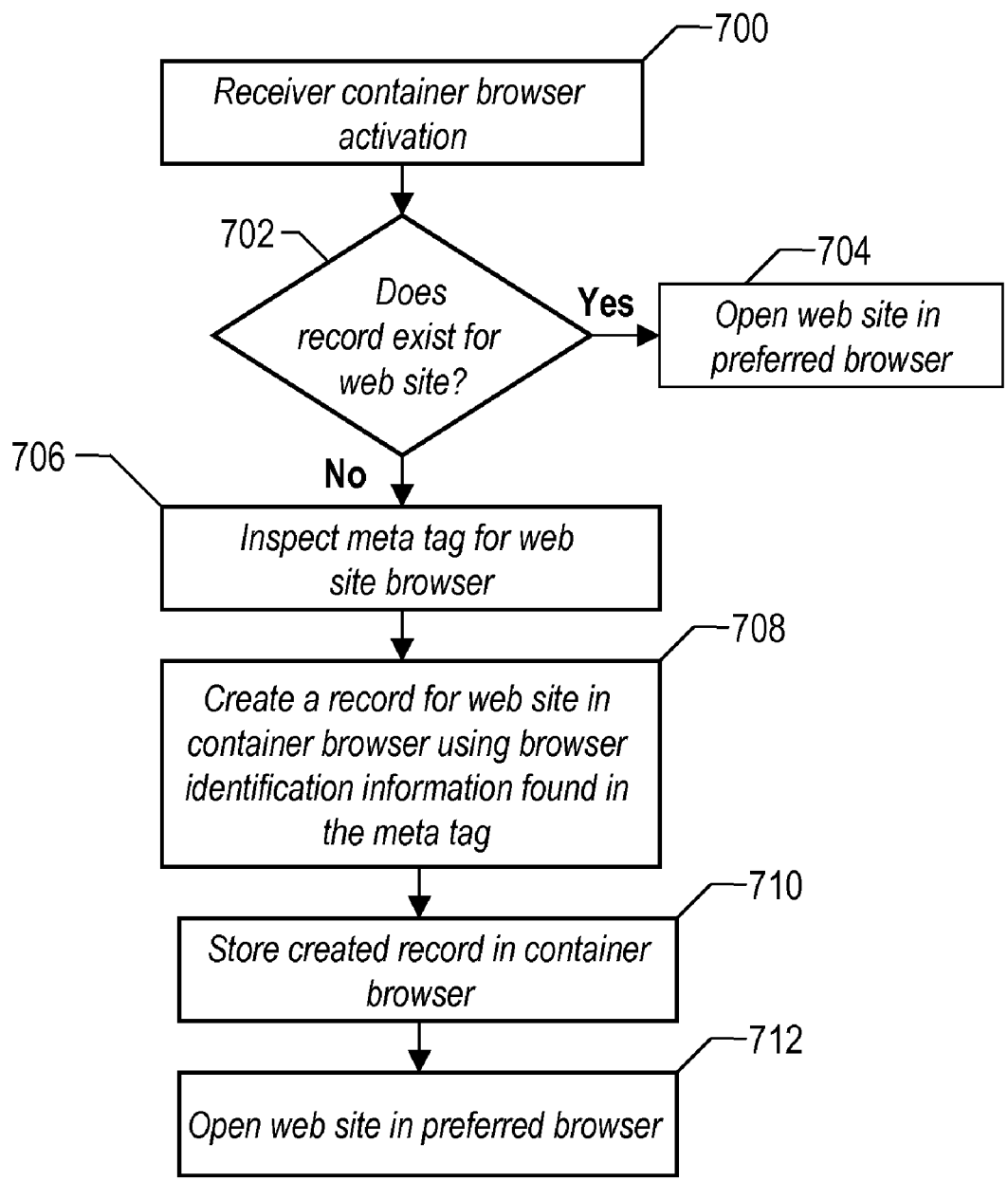
FIG. 7 is a flow diagram of the steps involved in identifying a specific browser contained within a web page through which a user can view a website.

Referring to FIG. 7, shown is a flow diagram of the steps involved in identifying a specific browser contained within a web page through which a user can view a website. This method can be implemented as part of container browser system such as the one described in U.S. patent application AUS920070184US1 invented by the same inventors as the present invention. Prior to the activation of this method, the web page designer specifies a preferred web browser in the meta tag as previously described. A user incorporating the method of the present invention may desire to access the web page. When the web page access attempt is detected at the user's computing device, step 700 activates this method. The program containing the method of the present invention can be incorporated into a container browser located on the user's computing device. Step 702 makes a determination of whether a record for the web page already exists in the container browser for this particular web page. If the determination is that a record does currently exist for this web page, then the method move to step 704 where the web page is opened using the previously identified web browser. If the determination of step 702 is that there is not an existing record for the accessed web page, then the method moves to step 706. In this step, there is an inspection of the meta tag for the web page for the purpose of identifying a preferred web browser. After the identification of the preferred web browser, step 708 creates a record for the web page in a container browser. Browser identification information found in the meta tag is incorporated into the record. Step 710 then stores the created record in the container browser. At this point, step 712 opens the web page for which the user has attempted the access.

Figure 8:
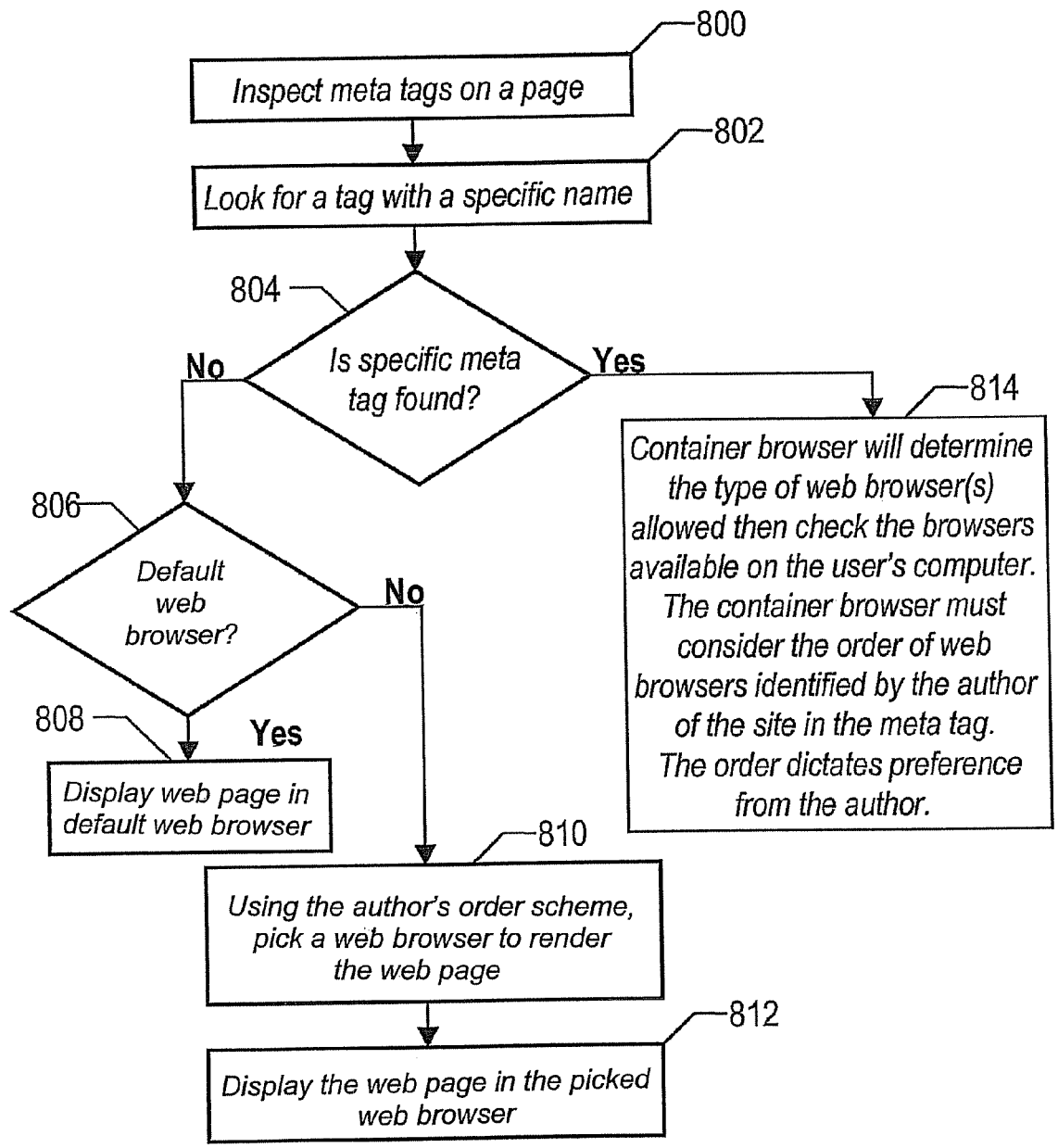
FIG. 8 is a flow diagram of the steps involved in inspecting web page meta tags contained in the source code of a web page and retrieving a web browser identified in the meta tags in accordance with the present invention.

FIG. 8 is a more detailed flow diagram of the steps involved when attempting to activate a web browser in accordance with the present invention. When the user accesses the potential web page, step 800 will intercept the web page before it is displayed and will inspect the meta tags in the web page to identify any preferred web browser contained in the meta tags. As part of the inspection, step 802 searches for a meta tag with a specific name. One reason for this search is that not every web page will have in its' meta tags a preferred browser. In this case, the method of the present invention of using information in the meta tag to identify a preferred web browser will not apply. In step 804, there is determination of whether the search produced a meta tag with web browser information. If there is no browser information found, the method moves to step 806 where there is a determination of whether the computing device has a default web browser. If there is a default web browser, step 808 will display the web page in that default web browser. In the event there is no default web browser, but there are multiple web browsers on the computing equipment, the method moves to step 810, which uses an order scheme created by the web page author or designer to select a web browser to open the web page and may display the web page. Thus, if there is no default web browser, but there are multiple web browsers on the computing equipment, the web browser is selected from the multiple web browsers on the computing equipment, through use of the order scheme created by the web author or designer. Step 812 will then open the web page with the selected web browser. Referring back to step 804, when the search does find a specific meta tag, the method moves to step 814. In this step, the container browser will determine the type of web browser(s) allowed then check the web browsers available on the user's computer. The container browser must consider the order of web browsers identified by the author of the web site in the meta tag. The order dictates preference from the web page author or designer. Thus, the web browser is selected from the browsers available on the user's computer, based on the order of web browsers identified by the web page author of the web site in the meta tag.

Figure 9:
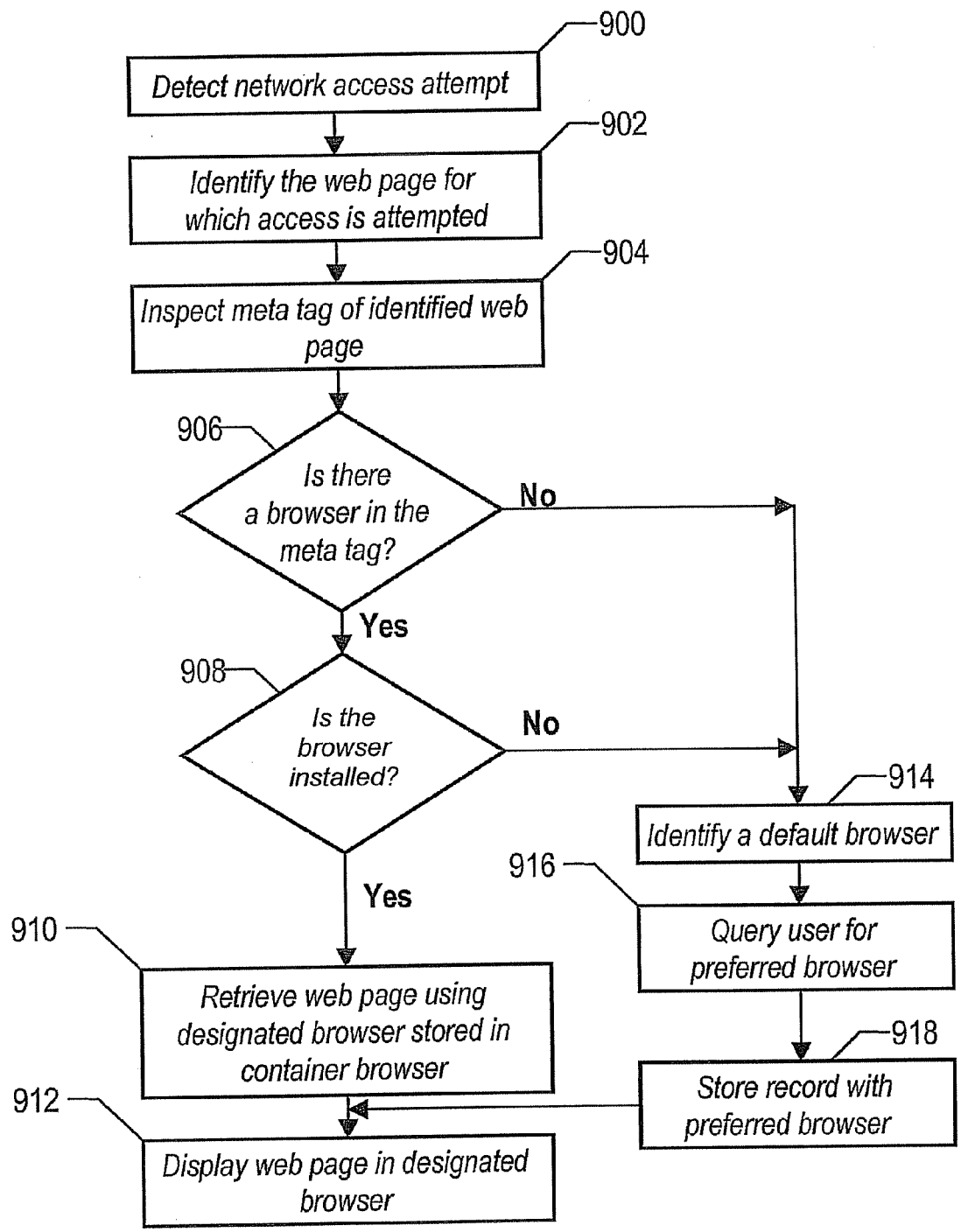
FIG. 9 is a flow diagram of the steps of displaying a web page through an identified web browser in accordance with the method of the present invention when the identified browser is not contained on the user-computing device.

FIG. 9 describes the steps in the present when a user desires to display a web page. In this method, in step 900, there is an initial detection of a user's attempt to establish a connection with a communication network. This initial access attempt is made through browser software on the computing device. As part of the access process, step 902 identifies the web page for which the access is attempted. Step 904 inspects the meta tags of the identified web page to locate a preferred web browser that the web designer may have specified for the web page. As a result of step 904, step 906 makes a determination of whether there is a specified web browser in the meta tags of the identified web page. If there is an identified browser in the meta tags, step 908 makes a determination of whether the identified web browser is installed and available in the user's computing device. Not every web browser is contained on every computing device. Therefore even though the web designer has specified a preferred web browser, this specified web browser might not be available on the computing device. Referring to step 908, if the specified browser is available on the computing device, step 910 retrieves the desired web page using the specified web browser which may be listed in the container browser. Step 912 displays the web page to the user through the specified web browser.

Referring again to step 906 and 908, if in either step there is no web browser specified in the meta tags or if the specified web browser is not available on the user's computing device, the method moves to step 914 which identifies a default web browser. The web page can be initially displayed using the default web browser. However, at this point, step 916 queries the user to determine whether user wants to use a different web browser to display the web page. Step 918 can create a record of the web page in the container browser including the default browser or a browser specified by the user.

One point to note is that many web sites have multiple pages. For example, the patent office web site has links to many pages referred to as web pages with the web site. The present invention can also enable a user to designate a particular web page within the web site that can be displayed with a particular web browser.

It is important to note that while the present invention has been described in the context of a fully functioning data processing system, those skilled in the art will appreciate that the processes of the present invention are capable of being distributed in the form of instructions in a computer readable medium Examples of computer readable media include media such as EPROM, ROM, tape, paper, floppy disc, hard disk drive, RAM, and CD-ROMs.

We claim:

1. A method for displaying on a computing device a web page which is accessed through a communication network and displayed through a specifically identified web browser program that enables a user to view and interact with text, images, and other information contained in the accessed web page, said method comprising:

detecting an access attempt to access a web page of a web site through the communication network;

identifying the web page for which access is being attempted by the access attempt;

determining that an existing condition is satisfied, wherein the existing condition is selected from the group consisting of a first condition, a second condition, a third condition, and a fourth condition;

responsive to said determining that the existing condition is satisfied, determining a preferred web browser based on the existing condition; and displaying the preferred web page via the preferred web browser;

wherein the computing device comprises a processor and a container browser that includes program instructions;

wherein said determining that the existing condition is satisfied is performed by execution of the program instructions by the processor;

wherein the first condition is that the web page does not include a specified meta tag having a specified name, that the computing device does not comprise a default web browser, and that the computing device comprises multiple web browsers;

wherein when the existing condition that is satisfied is the first condition, then said determining the preferred web browser comprises determining the preferred web browser from the multiple web browsers based on a web browser order scheme created by an author of the web page;

wherein the second condition is that the web page includes the specified meta tag having the specified name and that the specified meta tag includes a plurality of web browsers;

wherein when the existing condition that is satisfied is the second condition, then said determining the preferred web browser comprises: determining that available web browsers are available on the computing device, and determining the preferred web browser from a specified order of the web browsers of the plurality of web browsers as specified by the author of the web page such that the preferred web browser is a web browser of the available web browsers on the computing device;

wherein the third condition is that the web page includes the specified meta tag having the specified name and that the specified meta tag includes a designated web browser and no other web browser;

wherein when the existing condition that is satisfied is the third condition, then said determining the preferred web browser comprises: retrieving a web browser identifier of the designated web browser from the specified meta tag, determining that the designated web browser is installed and available on the computing device, and determining the preferred web browser as being the designated web browser that has been determined to be stored in the container browser and has been determined to be installed and available on the computing device;

wherein the fourth condition is that the web page includes the specified meta tag having the specified name and that the specified meta tag does not include any web browser;

wherein when the existing condition that is satisfied is the fourth condition, then said determining the preferred web browser comprises: identifying the default web browser, receiving from the user an identification of a different web browser to be used instead of the default web browser for displaying the web page, and determining the preferred web browser as being the different web browser whose identification has been received from the user.

2. The method of claim 1, wherein the satisfied condition is the first condition that is satisfied.

3. The method of claim 1, wherein the satisfied condition is the second condition that is satisfied.

4. The method of claim 1, wherein the satisfied condition is the third condition that is satisfied.

5. The method of claim 1, wherein the satisfied condition is the fourth condition that is satisfied.

6. The method of claim 1, wherein the method further comprises:

prior to said detecting the access attempt, creating a plurality of records in the container browser, each record comprising a web browser identifier of an individual web browser and an associated web site identifier of an individual web site whose web pages the individual web browser is configured to display, said individual web browser being used for retrieving and displaying on a screen of the computing device a particular web page of the individual web site when the computing device is connected to the individual web site via the communication network;

after said creating the plurality of records in the container browser, attempting to access a specific web page of a specific web site;

responsive to said attempting to access the specific web page of the specific web site, determining that the plurality of records in the container browser does not comprise a record that includes a web site identifier of the specific web site;

responsive to said determining that the plurality of records in the container browser does not comprise said record that includes the web site identifier of the specific web site, determining that the specific web page comprises a specific meta tag that does not include a web browser identifier of a specific web browser associated with the specific web site; and responsive to said determining that the specific web page comprises said specific meta tag that does not include the web browser identifier of the specific web browser associated with the specific web site, adding a new record to the plurality of records in the container browser, wherein the new record comprises the web site identifier of the specific web site and the web browser identifier of the specific web browser associated with the specific web site.

7. A system comprising a computing device, said computing device comprising a processor and a computer readable memory device coupled to the processor, said memory device containing software code which upon being executed by the processor implement a method for displaying on a computing device a web page which is accessed through a communication network and displayed through a specifically identified web browser program that enables a user to view and interact with text, images, and other information contained in the accessed web page, said method comprising:

detecting an access attempt to access a web page of a web site through the communication network;

identifying the web page for which access is being attempted by the access attempt;

determining that an existing condition is satisfied, wherein the existing condition is selected from the group consisting of a first condition, a second condition, a third condition, and a fourth condition;

responsive to said determining that the existing condition is satisfied, determining a preferred web browser based on the existing condition; and displaying the preferred web page via the preferred web browser;

wherein the first condition is that the web page does not include a specified meta tag having a specified name, that the computing device does not comprise a default web browser, and that the computing device comprises multiple web browsers;

wherein when the existing condition that is satisfied is the first condition, then said determining the preferred web browser comprises determining the preferred web browser from the multiple web browsers based on a web browser order scheme created by an author of the web page;

wherein the second condition is that the web page includes the specified meta tag having the specified name and that the specified meta tag includes a plurality of web browsers;

wherein when the existing condition that is satisfied is the second condition, then said determining the preferred web browser comprises: determining that available web browsers are available on the computing device, and determining the preferred web browser from a specified order of the web browsers of the plurality of web browsers as specified by the author of the web page such that the preferred web browser is a web browser of the available web browsers on the computing device;

wherein the third condition is that the web page includes the specified meta tag having the specified name and that the specified meta tag includes a designated web browser and no other web browser;

wherein when the existing condition that is satisfied is the third condition, then said determining the preferred web browser comprises: retrieving a web browser identifier of the designated web browser from the specified meta tag, determining that the designated web browser is installed and available on the computing device, and determining the preferred web browser as being the designated web browser that has been determined to be stored in the container browser and has been determined to be installed and available on the computing device;

wherein the fourth condition is that the web page includes the specified meta tag having the specified name and that the specified meta tag does not include any web browser;

wherein when the existing condition that is satisfied is the fourth condition, then said determining the preferred web browser comprises: identifying the default web browser, receiving from the user an identification of a different web browser to be used instead of the default web browser for displaying the web page, and determining the preferred web browser as being the different web browser whose identification has been received from the user.

8. The system of claim 7, wherein the satisfied condition is the first condition that is satisfied.

9. The system of claim 7, wherein the satisfied condition is the second condition that is satisfied.

10. The system of claim 7, wherein the satisfied condition is the third condition that is satisfied.

11. The system of claim 7, wherein the satisfied condition is the fourth condition that is satisfied.

12. The system of claim 7, wherein the method further comprises:

prior to said detecting the access attempt, creating a plurality of records in the container browser, each record comprising a web browser identifier of an individual web browser and an associated web site identifier of an individual web site whose web pages the individual web browser is configured to display, said individual web browser being used for retrieving and displaying on a screen of the computing device a particular web page of the individual web site when the computing device is connected to the individual web site via the communication network;

after said creating the plurality of records in the container browser, attempting to access a specific web page of a specific web site;

responsive to said attempting to access the specific web page of the specific web site, determining that the plurality of records in the container browser does not comprise a record that includes a web site identifier of the specific web site;

responsive to said determining that the plurality of records in the container browser does not comprise said record that includes the web site identifier of the specific web site, determining that the specific web page comprises a specific meta tag that does not include a web browser identifier of a specific web browser associated with the specific web site; and responsive to said determining that the specific web page comprises said specific meta tag that does not include the web browser identifier of the specific web browser associated with the specific web site, adding a new record to the plurality of records in the container browser, wherein the new record comprises the web site identifier of the specific web site and the web browser identifier of the specific web browser associated with the specific web site.

13. A computer program product, comprising a computer readable storage medium having computer readable software code stored therein, said software code which upon being executed by a processor of a computing device implement a method for displaying on a computing device a web page which is accessed through a communication network and displayed through a specifically identified web browser program that enables a user to view and interact with text, images, and other information contained in the accessed web page, said method comprising:

detecting an access attempt to access a web page of a web site through the communication network;

identifying the web page for which access is being attempted by the access attempt;

determining that an existing condition is satisfied, wherein the existing condition is selected from the group consisting of a first condition, a second condition, a third condition, and a fourth condition;

responsive to said determining that the existing condition is satisfied, determining a preferred web browser based on the existing condition; and displaying the preferred web page via the preferred web browser;

wherein the first condition is that the web page does not include a specified meta tag having a specified name, that the computing device does not comprise a default web browser, and that the computing device comprises multiple web browsers;

wherein when the existing condition that is satisfied is the first condition, then said determining the preferred web browser comprises determining the preferred web browser from the multiple web browsers based on a web browser order scheme created by an author of the web page;

wherein the second condition is that the web page includes the specified meta tag having the specified name and that the specified meta tag includes a plurality of web browsers;

wherein when the existing condition that is satisfied is the second condition, then said determining the preferred web browser comprises: determining that available web browsers are available on the computing device, and determining the preferred web browser from a specified order of the web browsers of the plurality of web browsers as specified by the author of the web page such that the preferred web browser is a web browser of the available web browsers on the computing device;

wherein the third condition is that the web page includes the specified meta tag having the specified name and that the specified meta tag includes a designated web browser and no other web browser;

wherein when the existing condition that is satisfied is the third condition, then said determining the preferred web browser comprises: retrieving a web browser identifier of the designated web browser from the specified meta tag, determining that the designated web browser is installed and available on the computing device, and determining the preferred web browser as being the designated web browser that has been determined to be stored in the container browser and has been determined to be installed and available on the computing device;

wherein the fourth condition is that the web page includes the specified meta tag having the specified name and that the specified meta tag does not include any web browser;

wherein when the existing condition that is satisfied is the fourth condition, then said determining the preferred web browser comprises: identifying the default web browser, receiving from the user an identification of a different web browser to be used instead of the default web browser for displaying the web page, and determining the preferred web browser as being the different web browser whose identification has been received from the user.

14. The computer program product of claim 13, wherein the satisfied condition is the first condition that is satisfied.

15. The computer program product of claim 13, wherein the satisfied condition is the second condition that is satisfied.

16. The computer program product of claim 13, wherein the satisfied condition is the third condition that is satisfied.

17. The computer program product of claim 13, wherein the satisfied condition is the fourth condition that is satisfied.

18. The computer program product of claim 13, wherein the method further comprises:

prior to said detecting the access attempt, creating a plurality of records in the container browser, each record comprising a web browser identifier of an individual web browser and an associated web site identifier of an individual web site whose web pages the individual web browser is configured to display, said individual web browser being used for retrieving and displaying on a screen of the computing device a particular web page of the individual web site when the computing device is connected to the individual web site via the communication network;

after said creating the plurality of records in the container browser, attempting to access a specific web page of a specific web site;

responsive to said attempting to access the specific web page of the specific web site, determining that the plurality of records in the container browser does not comprise a record that includes a web site identifier of the specific web site;

responsive to said determining that the plurality of records in the container browser does not comprise said record that includes the web site identifier of the specific web site, determining that the specific web page comprises a specific meta tag that does not include a web browser identifier of a specific web browser associated with the specific web site; and responsive to said determining that the specific web page comprises said specific meta tag that does not include the web browser identifier of the specific web browser associated with the specific web site, adding a new record to the plurality of records in the container browser, wherein the new record comprises the web site identifier of the specific web site and the web browser identifier of the specific web browser associated with the specific web site.

* * * * *